Feb. 27, 1934.  F. SMETAK  1,949,261
MITER BOX AND SAW GUIDE
Filed Oct. 30, 1933
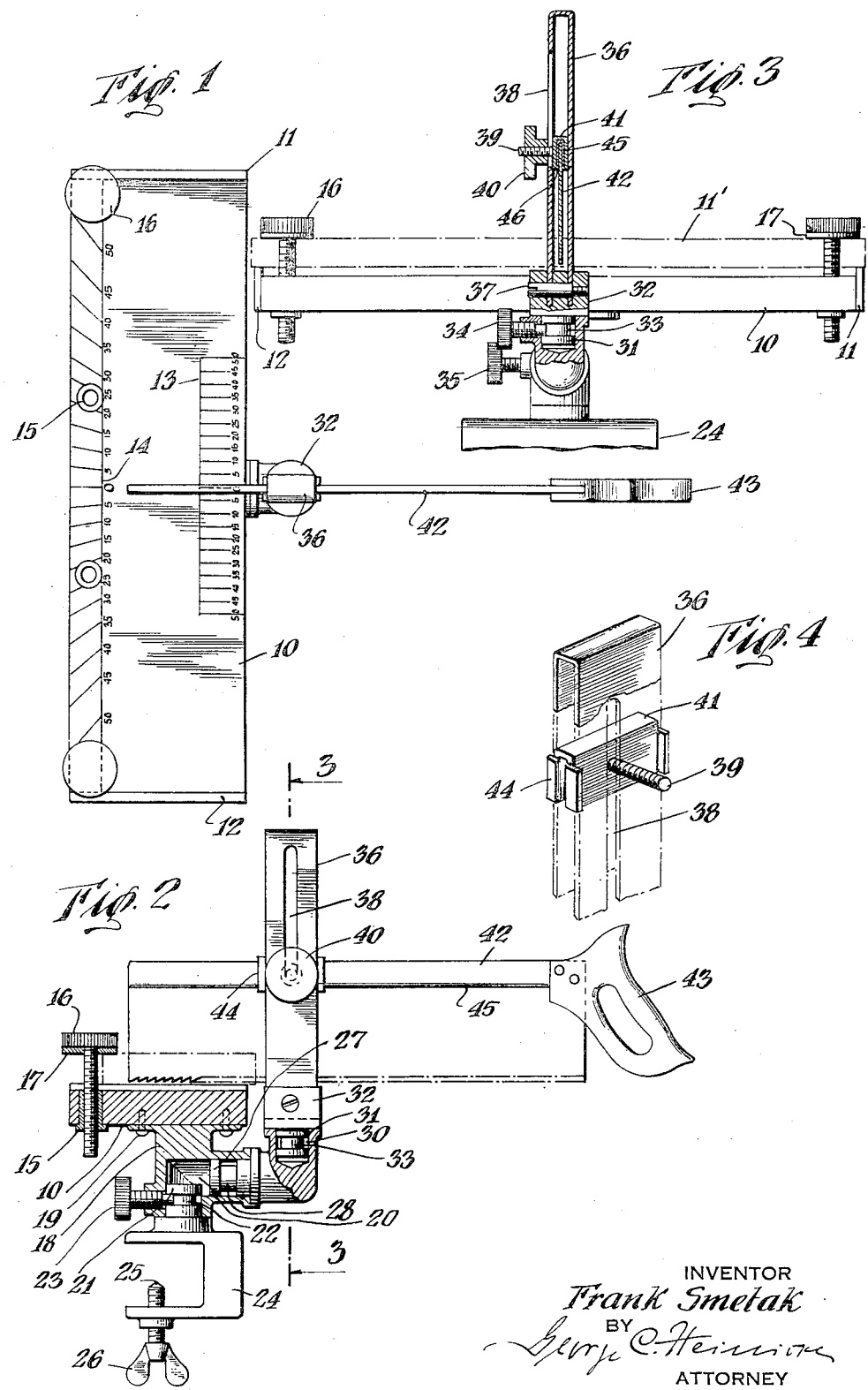
INVENTOR
Frank Smetak
BY
George C. Heinrich
ATTORNEY Patented Feb. 27, 1934

1,949,261

UNITED STATES PATENT OFFICE 1,949,261

MITER BOX AND SAW GUIDE

Frank Smetak, New York, N. Y.

Application October 30, 1933. Serial No. 695,780

3 Claims. (Cl. 143—89)

This invention relates to improvements in the so-called miter boxes and it is the principal object of my invention to provide a device of this character which is comparatively simple and inexpensive in its construction, yet durable and highly efficient in operation.

Another object of my invention is the provision of a saw guide allowing the turning of the saw blade to any desired angle to the work piece and to lock it in any of its adjusted angular positions indicated by suitable graduations in a fibre support for the work-piece for the cutting of miter joints for picture frames, panel-strips for furniture.

A further object of my invention is the provision of a miter box and saw guide which can readily be turned by means of grooved heads in suitable chambers in an L-casting adapted to be clamped or otherwise secured to any suitable support, whereby set screws entering the grooves of said heads allow a locking of the parts in any of their numerous adjusted positions to hold the saw blade at any desired angle to the work piece.

A still further object of my invention is the provision of a saw guide easily attached to a supporting head also rotatably held in the casting, the guide being provided with a movable member straddling the saw blade which can be readily adjusted and locked at any height to the work piece.

These and other objects and advantages of my invention will become more fully known as the description thereof proceeds, and will then be specifically defined in the appended claims.

In the accompanying drawing forming a material part of this disclosure:

Fig. 1 is a top plan view of a miter box or saw guide constructed according to my invention.

Fig. 2 is a sectional end elevation thereof.

Fig. 3 is a section on line 3—3 of Figure 2.

Fig. 4 is a fragmentary detail view of a saw guide.

As illustrated, a fibre board 10 having raised end strips 11 and 12 serving as support for the work-piece 11' has near its inner edges a graduated index-plate 13 provided on its upper face, the graduations of which start from 0 in the centre increasing towards the right or left to fifty to show to what degrees the saw is to be set for certain cuts.

The front edge of the fibre board is provided with a brass strip having angularly disposed lines 14 to determine the positive angles at which the miter joints are to be cut.

The board 10 is provided at certain intervals with metal sockets 15 for the passage of the set screws 16 equipped at their underside with washers 17.

A metal casting 18 having substantially L-shape in cross-section is attached to the lower face of the fibre board 10 by means of screws 19 or the like.

A chamber 20 is formed in casting 18 having also substantially L-shape open at the bottom and at one side. Through the bottom opening a head 21 having a groove 22 formed therein enters chamber 20, the groove of which is adapted to be engaged by a set screw 23 entering laterally through the wall of casting 18, so that the head 21 may be turned in chamber 20 in any direction.

The head 22 is integrally formed with a clamping member 24 by means of which the device is adapted to be clamped to a suitable support by means of a screw 25 and wing nut 26.

Through the lateral opening in the wall of chamber 20 a head 27 is entered also grooved, as at 28 and formed at the inner end of an L-piece 29 the outer end of which has also formed therein a chamber 30 into which extends the head 31 at the lower end of a boss 32 having a peripheral groove 33. A set screw 34 engages with its inner end in the groove 33, while a set screw 35 enters laterally the chamber and groove 28 of head 27.

The boss 32 has formed therein two vertical slots for the reception of the lower ends of the shanks of a saw guide 36 held therein by means of a screw 37.

One of the shanks of the saw guide has formed therein a longitudinally extending slot 38 through which extends the saw 39 carrying at its outer end a lock nut 40. The inner end of screw 39 is secured to a member 41 straddling the back of the saw blade 42 equipped with the usual handle 43, while outwardly turned flaps or lips 44 guide the movable member 41 in the guide 36. The upper edge of the saw blade is reinforced as indicated at 45 and the inwardly directed lower flanges 46 on the sides of member 41 grip under the ends of the reinforcing strip 45 of the saw to support the same.

In use the casting 18 and fibre board are clamped by means of the clamp 24 to a suitable support and the saw is introduced into its guide and held therein by means of the nut 40 and screw 39, at the desired height while supported by the engagement between the lower flaps of member 41 with the reinforcement 45 of the saw.

The saw is then adjusted at the proper angle by suitably turning the guide and the several heads and by locking the parts in their respective adjusted positions by means of the set screws.

It will be understood that I have described and shown the preferred form of my invention only as one example of the many possible ways to practically construct the same, and that I may make such changes in the general arrangement thereof and in the construction of its minor details as come within the scope of the appended claims without departure from the spirit of my invention and the principles involved.

Having thus described my invention what I claim as new and desire to secure by Letters Patent is:

1. In a miter box having a graduated support for the work piece, an L-casting to which said support is attached, provided with an L-shaped chamber, grooved heads normally arranged in the branches of said L chamber, a clamp with which one of said heads is formed to clamp the support to a work bench or table, a set screw entering the groove in said clamp head to lock the same in its adjusted position, a grooved head on a second chambered L-member movable in the other branch of said first-named L-chamber, a set screw to engage the groove of said head to lock it in any of its adjusted positions, a saw guide and a boss formed with the same having a lower grooved head movable in the chambers of said second L-member to allow a turning of the saw guide and saw in the same at any desired angle to the work piece according to the graduations on said support.

2. In a saw guide for miter boxes a looped member having a longitudinal slot in one of its shanks, a boss slotted to receive the lower ends of the shanks of said member, a head on said box, a member in which said head is rotatably mounted, means to lock the parts in any of their relative adjusted positions, a reinforcement for the back of the saw, a slide piece straddling said saw, flanges formed on said slide piece engaging the saw reinforcement to support said saw in said guide, a set screw on said slide piece passed through the slot in the guide shank to allow the adjustment of the saw relatively to said guide member and a nut on said screw to lock it in any of its adjusted positions and front and rear laterally disposed tongues on said slide piece to guide the same and said guide member.

3. A miter joint and saw guide comprising a graduated fiber board, raised end edges on said board on which the work piece is supported, graduations at the front and graduated lines at the rear of said fibre board, metal sockets in said board and set screws having heads equipped with washers to enter said sockets for clamping the work piece to the board, a saw guide to guide a saw, and means to allow an adjustment of the saw in said guide to any angular position to the work piece and for locking the same in its adjusted position.

FRANK SMETAK.